United States Patent
Kent et al.

(10) Patent No.: US 6,717,721 B2
(45) Date of Patent: Apr. 6, 2004

(54) LARGE EFFECTIVE AREA ERBIUM DOPED FIBER OPTICAL AMPLIFIER

(75) Inventors: Leonard R. Kent, Corning, NY (US); Gregory G. Luther, W. Hartford, CT (US); William A. Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/328,611

(22) Filed: Dec. 19, 2002

(65) Prior Publication Data

US 2003/0156321 A1 Aug. 21, 2003

Related U.S. Application Data

(60) Provisional application No. 60/344,105, filed on Dec. 21, 2001.

(51) Int. Cl.$^7$ .............................. G02B 6/02; H01S 3/06
(52) U.S. Cl. .................. 359/341.5; 359/337.3; 359/341.1; 359/342; 372/6; 372/40; 385/127; 501/42; 501/97.2
(58) Field of Search .................. 359/337.3, 341.1, 359/341.5, 342; 372/6, 40; 385/126, 127; 264/1.24; 501/37, 42, 64, 97.2

(56) References Cited

U.S. PATENT DOCUMENTS 5,491,581 A * 2/1996 Roba ....................... 359/341.3
6,603,909 B2 * 8/2003 Varner ........................ 385/123
6,614,975 B2 * 9/2003 Richardson et al. ......... 385/127
6,650,812 B2 * 11/2003 Goyal et al. ................ 385/123

FOREIGN PATENT DOCUMENTS

JP          03585497       *  2/1996

* cited by examiner

Primary Examiner—Nelson Moskowitz
(74) Attorney, Agent, or Firm—Robert L. Carlson

(57) ABSTRACT

An optical waveguide amplifier fiber comprises a core region at least in part comprises $Er_2O_3$, $Al_2O_3$, $GeO_2$ and $Ga_2O_3$. The amplifier fiber also comprises an inner clad surrounding the core region, and an outer clad surrounding the inner clad. The relative refractive index percentages and radii of the core region, inner clad and outer clad are chosen from the following ranges: the relative refractive index percent of the core segment within the range of from about 0.5% to about 1.2%; the relative refractive index percent of the inner clad within the range of from about 0.0% to about 0.3%; the outer radius of the core region within the range of from about 2.0 $\mu$m to about 5.0 $\mu$m; and, the outer radius of the inner clad within the range of from about 3.8 $\mu$m to about 10.2 $\mu$m. The amounts of $Er_2O_3$, $Al_2O_3$, $GeO_2$ and $Ga_2O_3$ within the core region, and the relative refractive index percentages in the radii of the core region, inner clad and outer clad are selected to provide an effective area of greater than or equal to about 38.6 $\mu m^2$ at a wavelength of 1590 nm.

20 Claims, 2 Drawing Sheets

LARGE EFFECTIVE AREA ERBIUM DOPED FIBER OPTICAL AMPLIFIER

CROSS-REFERENCE TO RELATED APPLICATIONS

This application claims the benefit of priority under 35 U.S.C. §119(e) of U.S. Provisional Application Serial No. 60/344,105 filed on Dec. 21, 2001.

BACKGROUND OF THE INVENTION

1. Field of the Invention

The present invention is directed to an optical amplifier fiber or use in telecommunication systems and more particularly, an optical amplifier fiber having a large effective area and providing high absorption, linearity, and efficiency.

2. Technical Background

The continuous growth of bandwidth requirements in optical-based communication systems has resulted in a large demand for systems able to operate within several optical wavelength ranges including the S-band optical range, the C-band optical range, and the L-band optical range. The S-band is typically defined as the wavelengths between about 1465 nm and about 1525 nm, which lies below the C-band wavelength range which extends between about 1525 nm and about 1570 nm, which in turn lies just below the L-band wavelength range which extends between about 1570 nm and 1620 nm. In order to meet this explosive growth and demand for capacity in wavelength bandwidth in fiber optic transmission systems, system designers have begun to investigate those spectral regions lying beyond the conventional or C-band transmission band, including the aforementioned S-band and L-band wavelength ranges.

Erbium-doped fiber amplifiers are used to provide amplification in optical transmission systems, and particularly for deployment within those systems operating within the C-band wavelength range. Application of erbium doped fiber amplifiers within the telecommunication systems operating within the L-band wavelength range can be problematic in that lower excited-state population inversions are necessary to provide sufficiently flat gain spectra across the L-band wavelength range. Thus, longer lengths of fiber within the erbium-doped fiber amplifier or higher erbium concentrations therein are necessary to provide the same gain which would be provided within a given erbium doped fiber amplifier operating within the C-band wavelength range.

The longer lengths of fiber required in erbium doped fiber amplifiers utilized within the L-band wavelength range can result in a decrease in fiber efficiency and an increase in noise when compared with erbium doped fiber amplifier operating within the C-band wavelength range. Typically, the effective areas of erbium doped amplifier fibers are increased in an attempt to improve the "linearity" of the erbium doped fiber amplifiers. The reasoning for this approach has been that an increase in the effective area has the effect of enlarging the transverse optical power distribution in the fiber, thereby reducing the intensity of the optical power at any given point. This yields an erbium-doped fiber amplifier exhibiting a more linear material behavior. However, simply increasing the effective area of any particular erbium doped amplifier fiber by scaling the core diameter can have detrimental effects on optical performance including an increase in non-linear effects such as two-channel four-wave mixing. This is because the effective length of the deployed amplifier fiber may be increased in order to maintain absorption.

The spectroscopy of erbium within erbium doped fiber amplifiers operating within the L-band wavelength range thus poses several challenges with respect to designing the fiber amplifier to be used therein. These challenges include: (1) maximizing the effective area while simultaneously maintaining high absorption, (2) packaging amplifier modules with longer amplifier fibers required by the lower rate of gain while controlling fiber bend losses at longer wavelengths, (3) maintaining high absorption without significantly increasing concentration quenching, and (4) minimizing the intrinsically higher L-band noise figure.

SUMMARY OF THE INVENTION

This invention relates to an optical amplifier fiber that effects amplification of an optical signal within the L-band optical wavelength range. One aspect of the present invention relates to an optical waveguide amplifier fiber which comprises a core region having a relative refractive index $\Delta_1$ and an outer radius, the core region at least in part comprising $Er_2O_3$, and at least one other component selected from the group consisting of $Al_2O_3$, $GeO_2$, $Ga_2O_3$, $Ta_2O_3$, $P_2O_5$, or a combination thereof; an inner clad surrounding the core region and having a relative refractive index percent $\Delta_2$ and an outer radius; and an outer clad surrounding the inner clad and having a relative refractive index percent $\Delta_3$. The relative refractive index percentages and radii of the core region, the inner clad and the outer clad are chosen so that the relative refractive index percent of the core segment within the range of from about 0.5% to about 1.2%; the relative refractive index percent of the inner clad within the range of from about 0.0% to about 0.3%; the outer radius of the core region within the range of from about 2.0 $\mu$m to about 5.0 $\mu$m; the outer radius of the inner clad within the range of from about 3.8 $\mu$m to about 10.2 $\mu$m. The relative amounts of $Al_2O_3$ and/or $GeO_2$ and/or $Ga_2O_3$ within the core region, and the relative refractive index profile and percentages and radii of the core region, the inner clad and the outer clad are selected to provide an effective area of greater than or equal to about 38.6 $\mu m^2$, more preferably greater than about 44.0 $\mu m^2$, and most preferably greater than about 52.0 $\mu m^2$ at a wavelength of 1590 nm. Most preferably, the at least one other component comprises $Ga_2O_3$ in combination with $P_2O_5$.

The amounts of $Er_2O_3$, $Al_2O_3$ $GeO_2$ and $Ga_2O_3$ within the core region, and the relative refractive index percent and radii of the core region, the inner clad and the outer clad are preferably selected to provide a pin array bending loss of less than or equal to about 0.11 dB, more preferably less than 0.09 dB, and most preferably less than 0.01 dB at a wavelength of 1590 nm.

The relative refractive index percent of the core region preferably increases linearly as the radius of the core region increases. The amplifier fiber also preferably exhibits an overlap factor of greater than or equal to about 50%, more preferably greater than about 70% at a wavelength of 1590 nm. In preferred embodiments, the amplifier fiber exhibits a step-index core.

Another aspect of the invention relates to an optical waveguide amplifier fiber which comprises a core region having a relative refractive index $\Delta_1$ and an outer radius, the core region at least in part comprising $Er_2O_3$, and at least one other component selected from the group consisting of $Al_2O_3$, $GeO_2$, $Ga_2O_3$, $Ta_2O_3$, $P_2O_5$, or a combination thereof; an inner clad surrounding the core region and having a relative refractive index percent $\Delta_2$ and an outer radius; and an outer clad surrounding the inner clad and having a relative refractive index percent $\Delta_3$. The relative refractive index percentages and radii of the core region, the inner clad and the outer clad are chosen so that the relative refractive index percent of the core segment within the range of from about 0.5% to about 1.2%; the relative refractive index percent of the inner clad within the range of from about 0.0% to about 0.3%; the outer radius of the core region within the range of from about 2.0 μm to about 5.0 μm; the outer radius of the inner clad within the range of from about 3.8 μm to about 10.2 μm. The amounts of $Al_2O_3$ and/or $GeO_2$ and/or $Ga_2O_3$ within the core region, and the relative refractive index percentages and radii of the core region, the inner clad and the outer clad are selected to provide an effective area of greater than or equal to about 38.6 μm more preferably greater than about 44.0 $\mu m^2$, even more preferably greater than about 52.0 $\mu m^2$, and most preferably greater than about 63 $\mu m^2$ at a wavelength of 1590 nm. Most preferably, the at least one other component comprises $Ga_2O_3$ in combination with $P_2O_5$.

The amounts of $Er_2O_3$, $Al_2O_3$, $GeO_2$ and $Ga_2O_3$ within the core region, and the relative refractive index percent and radii of the core region, the inner clad and the outer clad are preferably selected to provide a pin array bending loss of less than or equal to about 0.11 dB, more preferably less than 0.09 dB, and most preferably less than 0.01 dB at a wavelength of 1590 nm.

The relative refractive index percent of the core region preferably increases linearly as the radius of the core region increases. The amplifier fiber also preferably exhibits an overlap factor of greater than or equal to about 50%, more preferably greater than about 70% at a wavelength of 1590 nm. In preferred embodiments, the amplifier fiber exhibits a step-index core.

The amplifer fibers disclosed herein may be employed as fibers in a telecommunication system, for example such a system that comprises one or more transmitters adapted to transmit an optical signal, a waveguide transmission fiber in optical communication with the transmitters; and a receiver adapted to receive the optical signal.

Another aspect of the invention relates to an optical waveguide amplifier fiber which comprises a core region having a relative refractive index percent and an outer radius, the core region at least in part comprising $Er_2O_3$, $Al_2O_3$, $GeO_2$ and $Ga_2O_3$ an inner clad surrounding the core region and having a relative refractive index percent and an outer radius; and an outer clad surrounding the inner clad and having a relative refractive index percent. The relative amounts of $Al_2O_3$ and/or $GeO_2$ and/or $Ga_2O_3$ within the core region, and the relative refractive index profile and percentages and radii of the core region, the inner clad and the outer clad are selected to provide an effective area of greater than or equal to about 38.6 $\mu m^2$, more preferably greater than about 44.0 $\mu m^2$, and most preferably greater than about 52.0 $\mu m^2$ at a wavelength of 1590 nm. Most preferably, the at least one other component comprises $Ga_2O_3$ in combination with $P_2O_5$.

The amounts of $Er_2O_3$, $Al_2O_3$, $GeO_2$ and $Ga_2O_3$ within the core region, and the relative refractive index percent and radii of the core region, the inner clad and the outer clad are preferably selected to provide a pin array bending loss of less than or equal to about 0.11 dB, more preferably less than 0.09 dB, and most preferably less than 0.01 dB at a wavelength of 1590 nm.

In a first embodiment, an optical waveguide fiber amplifier comprises a core region having a relative refractive index percent and an outer radius, wherein the core region at least in part comprises $Er_2O_3$ and at least one other component selected from the group consisting of $Al_2O_3$, $GeO_2$, $Ga_2O_3$, $Ta_2O_3$, $P_2O_5$, or combinations thereof. In one embodiment, the other dopant components in the core region include both $Ga_2O_3$ and $P_2O_5$. The optical amplifier fiber preferably also contains $SiO_2$, and more preferably is comprised predominately of $SiO_2$. The fiber also comprises an inner clad surrounding the core region and having a relative refractive index percent and an outer radius, and an outer clad surrounding the inner clad and having a relative refractive index percent. The relative refractive index percentages and radii of the core region, inner clad and the outer clad are preferably chosen from the following ranges: the relative refractive index percent of the core segment within the range of from about 0.5% to about 1.2%; the relative refractive index percent of the inner clad within the range of from about 0.0% to about 0.3%; the outer radius of the core region within the range of from about 2.0 μm to about 5.0 μm; and, the outer radius of the inner clad within the range of from about 3.8 μm to about 10.2 μm. The relative refractive index percentages and radii of the core region, inner clad and outer clad are preferably selected to provide an effective area of greater than or equal to about 38.6 μm at a wavelength of about 1590 nm. More specifically, the invention relates to an erbium-doped optical amplifier fiber operating in the L-band optical wavelength range and having a large effective area while minimizing effective length, and reducing the associated noise, and maintaining high efficiency sufficient bandwidth carrying capacity.

In a second embodiment, an optical waveguide fiber amplifier comprises a core region having a relative refractive index percent and an outer radius, wherein the core region at least in part comprises $SiO_2$, $Er_2O_3$, $Al_2O_3$, $GeO_2$, $Ta_2O_5$, $P_2O_5$ and/or $Ga_2O_3$. The optical amplifier fiber also comprises an inner clad surrounding the core region and having a relative refractive index percent and an outer radius, and an outer clad surrounding the inner clad and having a relative refractive index percent. The relative refractive index percentages and radii of the core region, the inner clad and the outer clad are selected to provide an overlap factor of greater than or equal to about 50%, and an effective area of greater than or equal to about 36.0 $\mu m^2$ at a wavelength of 1590 nm.

The present invention also includes optical communication systems employing the optical waveguide fiber amplifiers in accordance with the embodiments described above.

Reference will now be made in detail to the present preferred embodiments of the invention, examples of which are illustrated in the accompanying drawings. An exemplary embodiment of the segmented core refractive index profile of the present inventive optical waveguide fiber amplifier is shown in the figures.

DETAILED DESCRIPTION OF THE PREFERRED EMBODIMENT

Figure 1:
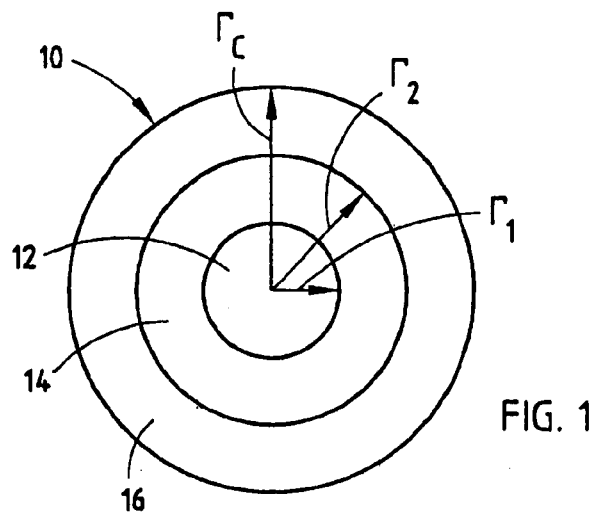
FIG. 1 is a schematic cross-sectional view of a novel optical amplifier fiber embodying the present invention.

Additional features and advantages of the invention will be set forth in the detailed description which follows and will be apparent to those skilled in the art from the description or recognized by practicing the invention as described in the following description together with the claims and appended drawings.

It is to be understood that the foregoing description is exemplary of the invention only and is intended to provide an overview and an understanding of the nature and character of the invention as it is defined in the claims. The accompanying drawings are included to provide a further understanding of the invention and are incorporated and constitute part of the specification. The drawings illustrate various features and embodiments of the invention which, together with their description, serve to explain the principles and operation of the invention.

Definitions

The following definitions and terminology are commonly used in the art:

The radii of the segments of the core and inner clad are defined in terms of the index of refraction of the material of which the segment is made. A particular segment has a first and a last refractive index point. A central segment has an inner radius of zero because the first point of the segment is on the center line. The outer radius of the central segment is the radius drawn from the waveguide center line to the last point of the refractive index of the central segment. For a segment having a first point away from the center line, the radius from the waveguide center line to the location of its first refractive index point is the inner radius of that segment. Likewise, the radius from the waveguide center line to the location of the last refractive index point of the segment is the outer radius of that segment. The segment radii may be conveniently defined in a number of ways. In this application, radii are defined in accord with the figures, described in detail below. The definitions of segment radius and refractive index, used to describe refractive index profile, in no way limit the invention.

The effective area is generally defined as, $$A_{eff} = 2\pi \left( \int E^2 r dr \right)^2 / \left( \int E^4 r dr \right),$$

wherein the integration limits are 0 to $\infty$, and E is the electric field associated with the propagated light.

The mode field diameter, $D_{mf}$, is measured using the Peterman II method wherein, $2w = D_{mf}$ and $w^2 = (2 \int E^2 r dr / \int [dE/dr]^2 r dr)$, the integral limits being 0 to $\infty$.

The relative refractive index $\Delta$ of a segment, $\Delta \%$, as used herein, is defined by the equation, $$\Delta \% = 100 \times \frac{n_i^2 - n_c^2}{2n_c^2}$$

where $n_i$ is the maximum refractive index of the index profile segment denoted as i, and $n_c$, the reference refractive index, is taken to be the refractive index of the clad layer. Every point in the segment has an associated relative index. The maximum relative index is used to conveniently characterize the segment whose general shape is known.

The term refractive index profile or index profile is the relation between $\Delta \%$ or refractive index and radius over a selected segment of the core.

Total dispersion is defined as the algebraic sum of waveguide dispersion and material dispersion. Total dispersion is also referred to as chromatic dispersion in the art.

The bend resistance of a waveguide fiber is expressed as induced attenuation under prescribed test conditions. The bend test referenced herein is the pin array bend test that is used to compare relative resistance of a waveguide fiber to bending. To perform the test, attenuation loss is measured for a waveguide fiber with essentially no induced bending loss. The waveguide fiber is then woven in a serpentine path through a pin array and attenuation is again measured. The loss induced by bending is the difference between the two measured attenuation values. The pin array is a set of ten cylindrical pins arranged in a single row and held in a fixed position on a flat surface. The pin spacing is 5 mm, center to center, and the pin diameter is 0.67 mm. During testing, sufficient tension is applied to make the serpentine woven waveguide fiber conform to the portions of the pin surface at which there is contact between the pin and the fiber.

The nonlinear process of four-wave mixing is generally approximated as, $$P_s^{out}(w_i + w_j - w_k) = n_{FWM}^{ijk} \cdot \frac{2^{10}\pi^6}{n^4 \lambda^2 c^2} \left( \frac{L_{eff}}{A_{eff}} \right)^2 d^2 X^{(3)^2} e^{-\alpha L} P_s^{in}(w_i) P_s^{in}(w_j) P_s^{in}(w_k) \alpha_s \frac{l_{eff}^2}{A_{eff}^2}$$

where $w_i$, $w_j$ and $w_k$ are the angular frequencies of three separate signals, $n_{FWM}^{ijk}$ the phase-dependent conversion frequency and n is the index of refraction, $\lambda$ is the wavelength, c is the speed of light in a vacuum, $l_{eff}$ is the effective length, $A_{eff}$ is the effective area, d is a degeneracy factor and this is equal to three if i and j are equal and 6 if they are unequal, $x^3$ is the nonlinear susceptibility, and $\alpha_s$ is the signal attenuation.

The overlap of an optical waveguide fiber is generally defined as the proportion of the power or intensity of the guided light within the fiber that interacts with a particular segment, such as an erbium doped core region or segment. In this document, the overlap will refer to the portion of the light in the central core segment 12 unless specifically stated otherwise.

One embodiment of an optical amplifier fiber in accordance with the present invention is a generally segmented structure, as shown in FIG. 1. A clad layer having a refractive index of $n_c$ surrounds the optical waveguide amplifier fiber. In the illustrated example (not shown to scale), an optical amplifier fiber 10 includes a core region or segment 12 having an outer radius $r_1$, an inner clad 14 having an outer radius $r_2$ and an outer clad 16 having an outer radius $r_c$.

Figure 2:
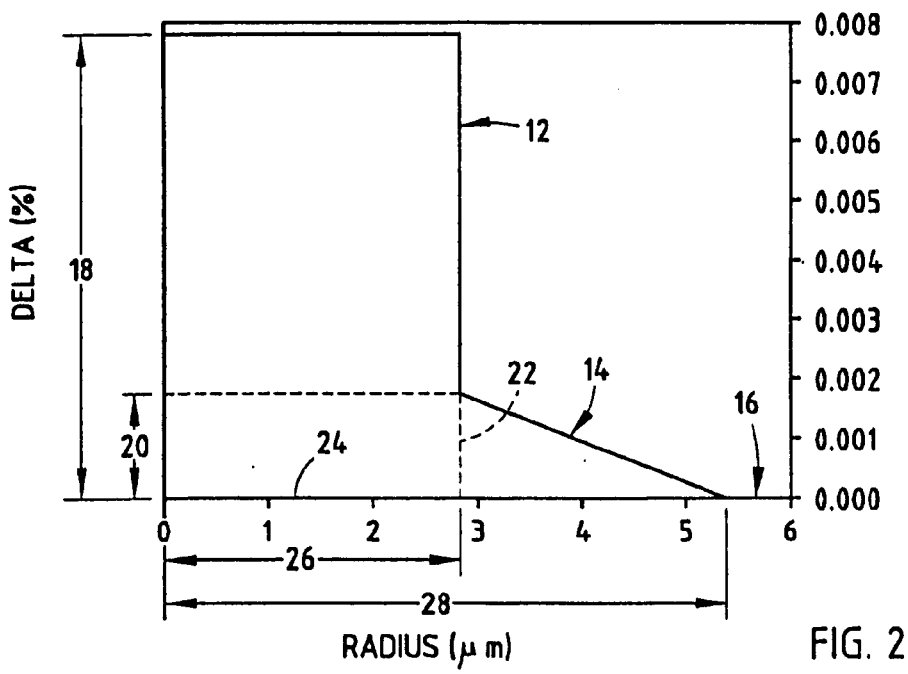
FIG. 2 is a diagram of a waveguide refractive index profile of a first embodiment of the amplifier fiber.

A general representation of the core refractive index profile of amplifier fiber 10 is illustrated in FIG. 2, which shows relative refractive index percent charted versus the amplifier fiber radius. Although FIG. 2 shows only three discrete segments, it is understood that the functional requirements may be met by forming an optical waveguide fiber amplifier having more than three segments. However, embodiments having fewer segments are usually easier to manufacture and are therefore preferred. Further, the illustrated core index profile has a step index, however, other indices may be utilized as described below.

The core region 12 of the optical waveguide fiber amplifier 10 illustrated is preferably composed of a silica based glass and is at least in part comprised of $Er_2O_3$; $Al_2O_3$, $GeO_2$, and $Ga_2O_3$. The inner clad 14 of amplifier fiber 10 is comprised of a silica based glass doped such that the refractive index profile of inner clad 14 decreases linearly as the radius increases. The outer clad 16 comprises undoped silica.

In a first embodiment, as illustrated in FIG. 2, core region 12 of amplifier fiber 10 has a relative refractive index percent 18, $\Delta_1$, of within the range of from about 0.5% to about 1.20%, more preferably of within the range of from about 0.65% to about 1.00%, and most preferably of within the range of from about 0.70% to about 0.86%, and an outer radius 26, $r_1$, of within the range of from about 2.00 μm to about 3.60 μm, more preferably of within the range of from about 2.20 μm to about 3.20 μm, and most preferably of within the range of from about 2.50 μm to about 3.10 μm. The radius 26, $r_1$, is the intersection of the core 12 and the inner clad 14. In this case, the intersection point coincides with the intersection of the extrapolated descending portion of the index profile of the core region 12, represented by line 22, with the horizontal axis 24, which coincides with the refractive index of the silica cladding. The outer radius 26, $r_1$, of core region 12 is also the inner radius of inner clad 14.

The inner cladding 14 of fiber amplifier 10 has a relative refractive index percent 20, $\Delta_2$, within the range of from about 0.10% to about 0.20%, more preferably of within the range of from about 0.16% to about 0.20%, and most preferably of within the range of from about 0.17% to about 0.19%, and an outer radius 28, $r_2$, within the range of from about 3.80 μm to about 7.60 μm, more preferably of within the range of from about 4.40 μm to about 6.50 μm, and most preferably of within the range of from about 4.86 μm to about 6.00 μm. The outer radius 28, $r_2$, is the intersection of inner clad 14 and outer clad 16. In this case, the intersection point coincides with the intersection of the profile of the inner clad 14 with the horizontal axis 24, which coincides with the refractive index of the silica cladding. The outer radius 28 of inner clad 14 is also the inner radius of the outer clad 16. The outer clad 16 surrounds inner clad 14 and has a relative refractive index percent, $n_c$, of approximately 0%, and an outer radius of approximately 62.5 μm, however, this radius can vary greatly.

The optical properties of the optical waveguide amplifier fiber illustrated in FIG. 2, corresponding to radial scales characterized by overlap factors of 50% and 70%, at a wavelength of 1590 nm are given in Table 1. By radial scaling, we mean drawing the fiber to different diameters so that the core diameter changes slightly. By scaling the core diameter upward or downward slightly from the typical 125 μm fiber diameter, the core diameter will likewise change, enabling the fiber properties to be easily achieved or optimized.

TABLE 1

Optical Properties of the Optical Waveguide Fiber of FIG. 2

| Optical Properties | 50% Overlap | 70% Overlap |
|---|---|---|
| Effective area (μm²) at 1590 nm | 38.6 | 38.9 |
| Mode field diameter (μm) at 1590 nm | 5.82 | 6.62 |
| Pin array bend loss (dB) at 1590 nm | 0.88 | 0.0003 |
| Dispersion (ps/nm-km) at 1590 nm | 1.57 | 13.50 |
| Dispersion slope (ps/nm²-km) at 1590 nm | 0.052 | 0.050 |
| Cut-off wavelength (nm) with 2 m fiber FOTP 80 | 1000 | 1360 |

Figure 3:
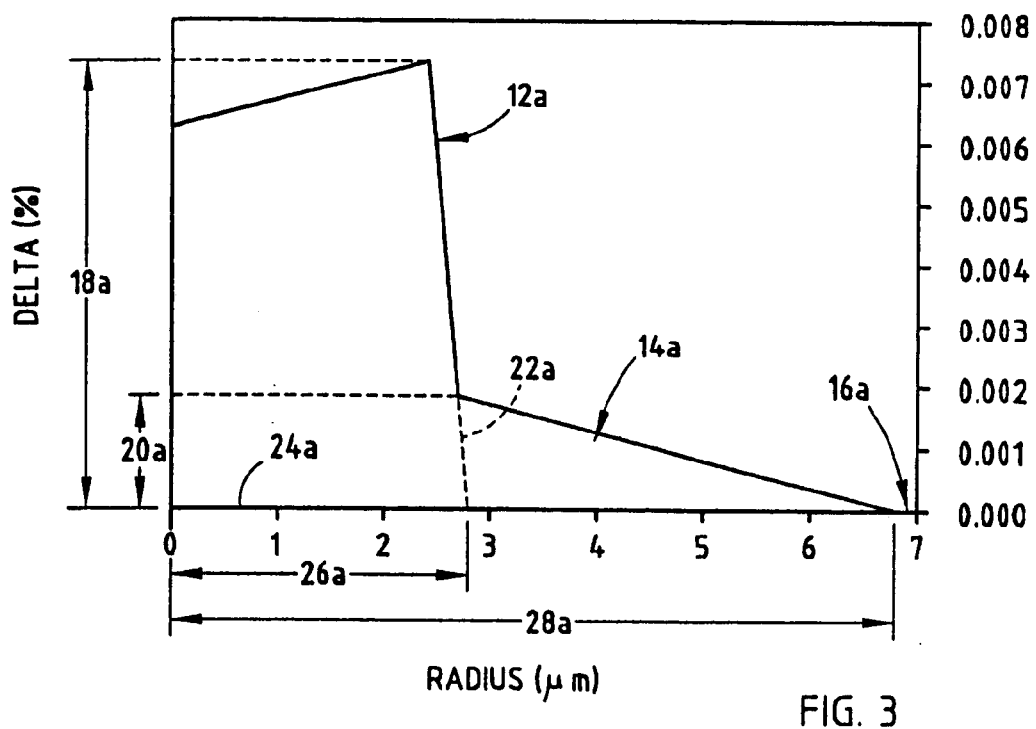
FIG. 3 is a diagram of a waveguide refractive index profile of a second embodiment of the optical amplifier fiber.

A preferred embodiment of the novel erbium doped optical amplifier fiber 10a is shown in FIG. 3. Since fiber amplifier 10a is similar to the previously described fiber amplifier 10, similar parts appearing in FIG. 2 and FIG. 3 are respectively represented by the same, corresponding reference numeral, except for the suffix "a" in the numerals of the later. The core region 12a, inner clad 14a and outer clad 16a are constructed similarly to the corresponding segments of fiber amplifier 10 and may be composed of similar materials.

The core region 12a of amplifier fiber 10a has a relative refractive index percent 18a, $\Delta_1$, of within the range of from about 0.50% to about 1.00%, more preferably of within the range of from about 0.60% to about 0.90%, and most preferably of within the range of from about 0.66% to about 0.80%. The relative refractive index percent of core region 12a linearly increases with an increase in radius. Core region 12a further has an outer radius 26a, $r_1$, of within the range of from about 2.10 μm to about 3.70 μm, more preferably of within the range of from about 2.35 μm to about 3.40 μm, and most preferably of within the range of from about 2.60 μm to about 3.30 μm. The radius 26a, $r_1$, is the intersection of the core 12a and the inner clad 14a. In this case, the intersection point is defined as the intersection of the vertical line extending downwardly from descending portion of the index profile of the core region 12a, represented by the line 22a, with the horizontal axis 24a, defined as the axis through the most negative point or points of the refractive index profile. The outer radius 26a, $r_1$, of core region 12a is also the inner radius of inner clad 14a.

The inner clad 14a of fiber amplifier 10a has a relative refractive index percent 20a, $\Delta_2$, within the range of from about 0.00% to about 0.25%, and more preferably of within the range of from about 0.10% to about 0.20%, and most preferably of within the range of from about 0.15% to about 0.19%. Inner clad 14a further has an outer radius 28a, $r_2$, within the range of from about 5.48 μm to about 9.60 μm, and more preferably of within the range of from about 6.15 μm to about 8.91 μm, and most preferably of within the range of from about 6.80 μm to about 8.57 μm. The radius 28a, $r_2$, is the intersection of inner clad 14a and outer clad 16a. In this case, the intersection point is defined as the intersection of the profile of the inner clad 14a with the horizontal axis 24a. The outer radius 28a of inner clad 14a is also the inner radius of outer clad 16a. The outer clad 16a surrounds inner clad 14a and has a relative refractive index percent, $n_c$, of approximately 0%, and an outer radius of approximately 62.5 μm, however, this radius can vary greatly. The profile of outer clad 16a linearly decreases with an increase in radius.

The optical properties of the optical waveguide fiber amplifier 10a illustrated in FIG. 3 corresponding to radially scaled overlap factors of 50% and 70%, at a wavelength of 1590 nm are given in Table 2.

TABLE 2

Optical Properties of the Optical Waveguide Fiber of FIG. 3

| Optical Properties | 50% Overlap | 70% Overlap |
|---|---|---|
| Effective area (μm²) at 1590 nm | 47.0 | 54.2 |
| Mode field diameter (μm) at 1590 nm | 7.62 | 8.31 |
| Pin array bend loss (dB) at 1590 nm | 0.11 | 0.0001 |
| Dispersion (ps/nm-km) at 1590 nm | 10.90 | 18.75 |
| Dispersion slope (ps/nm²-km) at 1590 nm | 0.057 | 0.056 |
| Cut-off wavelength (nm) with 2 m fiber FOTP 80 (280 min) | 1230 | 1680 |

Figure 4:
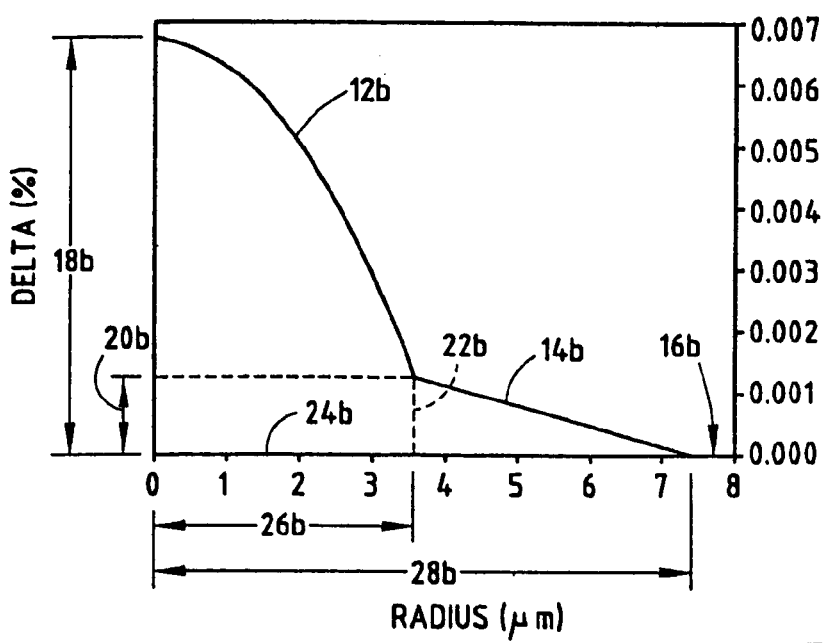
FIG. 4 is a diagram of a waveguide refractive index profile of a third embodiment of the optical amplifier fiber.

In another alternative embodiment, as shown in FIG. 4, an optical waveguide fiber amplifier 10b has a graded index profile. Since fiber amplifier 10b is similar to the previously described fiber amplifier 10, similar parts appearing in FIG. 2 and FIG. 4, are respectfully represented by the same, corresponding reference numeral, except for the suffix "b" in the numerals of the later. The core region 12b, inner clad 14b and outer clad 16b are constructed similarly to the corresponding segments of fiber amplifier 10 and are composed of similar materials. Further, the example illustrated in FIG. 4 is that of a graded-index fiber, however, profiles of other shapes may be utilized therefore.

The core region 12b of fiber amplifier 10b has a relative refractive index percent 18b, $\Delta_1$, of within the range of from about 0.55% to about 0.85%, more preferably of within the range of from about 0.60% to about 0.75%, and most preferably within the range of from about 0.62% to about 0.70%. Core region 12b further has an outer radius 26b, $r_1$, of within the range of from about 2.84 μm to about 5.00 μm, preferably of within the range of from about 3.20 μm to 4.60 μm, and most preferably of within the range of from about 3.50 μm to about 4.50 μm. The radius 26b, $r_1$, is the intersection of core 12b and inner clad 14b. In this case, the intersection point is defined as the intersection of the vertical line extending downwardly from descending portion of the index profile of core region 12b, represented by line 22b, with the horizontal axis 24b, defined as the axis through the most negative point or points of the refractive index profile. The outer radius 26b, $r_1$, of core region 12b is also the inner radius of inner clad 14b.

The inner clad 14b of fiber amplifier 10b has a relative refractive index percent 20b, $\Delta_2$, within the range of from about 0.08% to about 0.20%, preferably of within the range of from about 0.10% to about 0.15% and most preferably of within the range of from about 0.12% to about 0.14%. The outer radius 28b, $r_9$, of inner clad 14b is the intersection of inner clad 14b in the outer clad 16b. In this case, the intersection point is defined as the intersection of the profile of inner clad 14b with the horizontal axis 24b. The outer radius 28b of the inner clad is preferably within the range of from about 5.83 μm to about 10.20 μm, more preferably of within the range of from about 6.57 μm to about 9.49 μm, and most preferably of within the range of from about 7.30 μm to about 9.12 μm. The outer radius 28b is also the inner radius of outer clad 16b. Outer clad 16b surrounds inner clad 14b and has a relative refractive index percent, $n_c$, of approximately 0% and an outer radius of approximately 62.5 μm, however, this radius can vary greatly. The profile of outer clad 16b linearly decreases with an increase in radius.

The properties of the optical waveguide fiber amplifier 10b having an overlap factor of 50% and 70% at a wavelength of 1590 nm, are given in Table 3.

TABLE 3

Optical Properties of the Optical Waveguide Fiber of FIG. 4

| CORE TYPE Optical Properties | Parabolic | | Quartic | |
|---|---|---|---|---|
| | 50% Overlap | 70% Overlap | 50% Overlap | 70% Overlap |
| Effective area (μm$^2$) at 1590 nm | 63.0 | 56.0 | 39.0 | 49.0 |
| Mode field diameter (μm) at 1590 nm | 7.72 | 8.20 | 6.97 | 7.62 |
| Pin array bend loss (dB) at 1590 nm | 40.5 | 1.43 | 14.2 | 0.31 |
| Dispersion (ps/nm-km) at 1590 nm | 7.68 | 12.3 | 2.5 | 11.6 |
| Dispersion slope (ps/nm$^2$-km) at 1590 nm | 0.063 | 0.06 | 0.062 | 0.056 |
| Cut-off wavelength (nm) FOTP 80 (280 min) | 920 | 1150 | 913 | 1140 |

Figure 5:
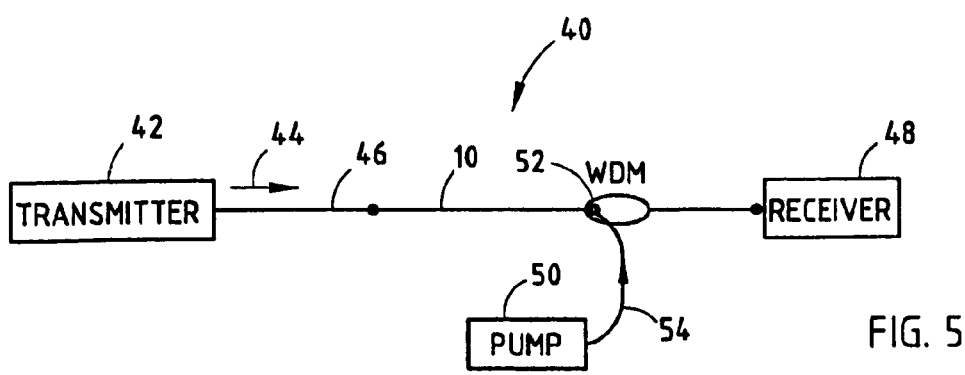
FIG. 5 is a schematic view of a fiber optic communication system employing the optical fiber amplifier.

As shown in FIG. 5, the optical waveguide fiber amplifier 10 is manufactured in accordance with the present invention and used in an optical fiber communication system 40. System 40 includes an optical transmitter 42 adapted to transmit an optical signal in a direction indicated by an arrow 44 through an optical waveguide transmission fiber 46 which is in optical communication with transmitter 42. System 40 also includes the optical waveguide fiber amplifier 10 in optical communication with transmission fiber 46 and an optical receiver 38 adapted to receive the optical signal 44. It should be noted that fiber amplifier 10 may be replaced by fiber amplifiers 10a or 10b within system 40. System 40 further includes an optical pump 50 in optical communication with fiber amplifier 10 via an optical coupler 52 such as a wave division multiplexer, and which is adapted to supply a pump radiation indicated by an arrow 54 to fiber amplifier 10. In most systems, each end of transmission fiber 46 and amplifier 10 will be capable of two-way communication, and transmitter 42 and receiver 48 are shown for illustration only.

The present inventive optical waveguide fiber amplifiers 10, 10a and 10b are highly efficient, thereby allowing for a reduction in the overall length of the amplifier fiber required to provide a sufficient amount of gain. This decrease in overall length results in a reduction in the non-linearity effects such as two-channel, four-wave mixing induced cross-talk introduced into a transmission signal by the fiber amplifier, and also reduces the associated noise factor. The decreased length of fiber amplifiers 10, 10a and 10b allows the amplifying fibers to be packaged in smaller amplification modules. Further, the relatively large effective area of amplifying fibers 10, 10a and 10b provides for an increase in maximum signal power within the L-band range as compared to previous fiber amplifiers.

It will become apparent to those skilled in the art that various modifications to the preferred embodiment of the invention as described herein can be made without departing from the spirit or scope of the invention as defined by the appended claims.

The invention claimed is:

1. An optical waveguide amplifier fiber, comprising:
   a core region having a relative refractive index $\Delta_1$, and an outer radius, the core region at least in part comprising $Er_2O_3$, and at least one other component selected from the group consisting of $Al_2O_3$, $GeO_2$, $Ga_2O_3$, $Ta_2O_3$, $P_2O_5$, or a combination thereof;
   an inner clad surrounding the core region and having a relative refractive index percent $\Delta_2$ and an outer radius; and
   an outer clad surrounding the inner clad and having a relative refractive index percent $\Delta_3$;
   wherein the relative refractive index percentages and radii of the core region, the inner clad and the outer clad are chosen from the following ranges:
      the relative refractive index percent of the core segment within the range of from about 0.5% to about 1.2%;
      the relative refractive index percent of the inner clad within the range of from about 0.0% to about 0.3%;
      the outer radius of the core region within the range of from about 2.0 μm to about 5.0 μm;
      the outer radius of the inner clad within the range of from about 3.8 μm to about 10.2 μm; and
   wherein the amounts of $Al_2O_3$ and/or $GeO_2$ and/or $Ga_2O_3$ within the core region, and the relative refractive index percentages and radii of the core region, the inner clad and the outer clad are selected to provide an effective area of greater than or equal to about 38.6 μm$^2$ at a wavelength of 1590 nm.

2. The amplifier of claim 1, wherein said at least one other component comprises $Ga_2O_3$ in combination with $P_2O_5$.

3. The amplifier fiber of claim 1, wherein the relative refractive index percent of the core region linearly increases as the radius of the core region increases.

4. The amplifier fiber of claim 3, wherein the amplifier fiber has an overlap factor of greater than or equal to about 50% at a wavelength of 1590 nm.

5. The amplifier fiber of claim 4, wherein the amounts of $Er_2O_3$, $Al_2O_3$, $GeO_2$ and $Ga_2O_3$ within the core region, and the relative refractive index percent and radii of the core region, the inner clad and the outer clad are selected to provide an effective area of greater than or equal to about 44.0 $\mu m^2$ area at a wavelength of 1590 nm.

6. The amplifier fiber of claim 5, wherein the amounts of $Er_2O_3$, $Al_2O_3$, $GeO_2$ and $Ga_2O_3$ within the core region, and the relative refractive index percent and radii of the core region, the inner clad and the outer clad are selected to provide a pin array bending loss of less than or equal to about 0.11 dB at a wavelength of 1590 nm.

7. The amplifier fiber of claim 1, wherein the amounts of $Er_2O_3$, $Al_2O_3$, $GeO_2$ and $Ga_2O_3$ within the core region, and the relative refractive index percent and radii of the core region, the inner clad and the outer clad are selected to provide a pin array bend loss of less than or equal to about 1.5 dB at a wavelength of 1590 nm.

8. The amplifier fiber of claim 7, wherein the relative refractive index percent of the core segment is within the range of from about 0.70% to about 0.86%, the outer radius of the core region is within the range of from about 2.50 $\mu m$ to about 3.10 $\mu m$, the relative refractive index of the inner clad is within the range of from about 0.17% to about 0.19%, and wherein the outer radius of the inner clad is within the range of from about 4.86 $\mu m$ to about 6.00 $\mu m$.

9. An optical fiber communication system, comprising:
    an transmitter adapted to transmit an optical signal;
    an optical waveguide transmission fiber in optical communication with the transmitter;
    the optical waveguide fiber amplifier of claim 1 in optical communication with the optical waveguide transmission fiber;
    an optical pump laser in optical communication with the optical waveguide fiber amplifier and adapted to supply a pump radiation thereto; and
    a receiver adapted to receive the optical signal.

10. An optical waveguide amplifier fiber, comprising:
    a core region having a relative refractive index percent and an outer radius, the core region at least in part comprising $Er_2O_3$, $Al_2O_3$, $GeO_2$ and $Ga_2O_3$;
    an inner clad surrounding the core region and having a relative refractive index percent and an outer radius; and
    an outer clad surrounding the inner clad and having a relative refractive index percent;
    wherein the relative refractive index percentages and radii of the core region, the inner clad and the outer clad, and the amount of $Er_2O_3$, $Al_2O_3$, $GeO_2$ and $Ga_2O_3$ within the core region are selected to provide:
    an overlap factor of greater than or equal to about 50%; and
    an effective area of greater than or equal to about 36.0 $\mu m^2$ at a wavelength of 1590 nm.

11. The amplifier fiber of claim 10, wherein the relative refractive index percent of the core linearly increases as the radius of the core region increases.

12. The amplifier fiber of claim 11, wherein the amounts of $Er_2O_3$, $Al_2O_3$, $GeO_2$ and $Ga_2O_3$ within the core region, and the relative refractive index percentages and radii of the core region, the inner clad and the outer clad are selected to provide an effective area of greater than or equal to about 44.0 $\mu m^2$ at a wavelength of 1590 nm.

13. The amplifier fiber of claim 12, wherein the amounts of $Er_2O_3$, $Al_2O_3$, $GeO_2$ and $Ga_2O_3$ within the core region, and the relative refractive index percentages and radii of the core region, the inner clad and the outer clad are selected to provide a pin array bend loss of less than or equal to about 0.11 dB at a wavelength of 1590 nm.

14. The amplifier fiber of claim 13, wherein the amplifier fiber has an overlap factor of greater than or equal to about 70% at a wavelength of 1590 nm.

15. The amplifier fiber of claim 14, wherein the amounts of $Er_2O_3$, $Al_2O_3$, $GeO_2$ and $Ga_2O_3$ within the core region, and the relative refractive index percent and radii of the core region, the inner clad and the outer clad are selected to provide an effective area of greater than or equal to about 52.0 $\mu m^2$ at a wavelength of 1590 nm.

16. The amplifier fiber of claim 15, wherein the amounts of $Er_2O_3$, $Al_2O_3$, $GeO_2$ and $Ga_2O_3$ within the core region, and the relative refractive index percent and radii of the core region, the inner clad and the outer clad are selected to provide a pin array bend loss of less than 0.01 dB at a wavelength of 1590 nm.

17. The amplifier fiber of claim 10, wherein the amplifier fiber core has a step-index core.

18. The amplifier fiber of claim 17, wherein the amounts of $Er_2O_3$, $Al_2O_3$, $GeO_2$ and $Ga_2O_3$ within the core region, and the relative refractive index percent and radii of the core region, the inner clad and the outer clad are selected to provide an effective area of greater than or equal to about 38.0 $\mu m$ at a wavelength of 1590 nm.

19. The amplifier fiber of claim 18, wherein the amounts of $Er_2O_3$, $Al_2O_3$, $GeO_2$ and $Ga_2O_3$ within the core region, and the relative refractive index percent and radii of the core region, the inner clad and the outer clad are selected to provide a pin array attenuation of less than or equal to about 0.9 dB at a wavelength of 1590 nm.

20. The amplifier fiber of claim 17, wherein the amplifier fiber has an overlap factor of greater than or equal to about 70% at a wavelength of 1590 nm.

* * * * *

UNITED STATES PATENT AND TRADEMARK OFFICE
CERTIFICATE OF CORRECTION

PATENT NO.     : 6,717,721 B2
DATED          : April 6, 2004
INVENTOR(S)    : Kent, Leonard R. et al.

It is certified that error appears in the above-identified patent and that said Letters Patent is hereby corrected as shown below:

Column 12,
Line 44, "38.0 $\mu$m at a wavelength of 1590 nm." should be -- "38.0 $\mu m^2$ at a wavelength of 1590 nm. --

Signed and Sealed this

Thirteenth Day of July, 2004

JON W. DUDAS
*Acting Director of the United States Patent and Trademark Office*